July 15, 1952 E. L. BOYCE ET AL 2,603,055
LAWN MOWER WITH REMOVABLE REEL ASSEMBLY
Filed March 21, 1946 3 Sheets-Sheet 1
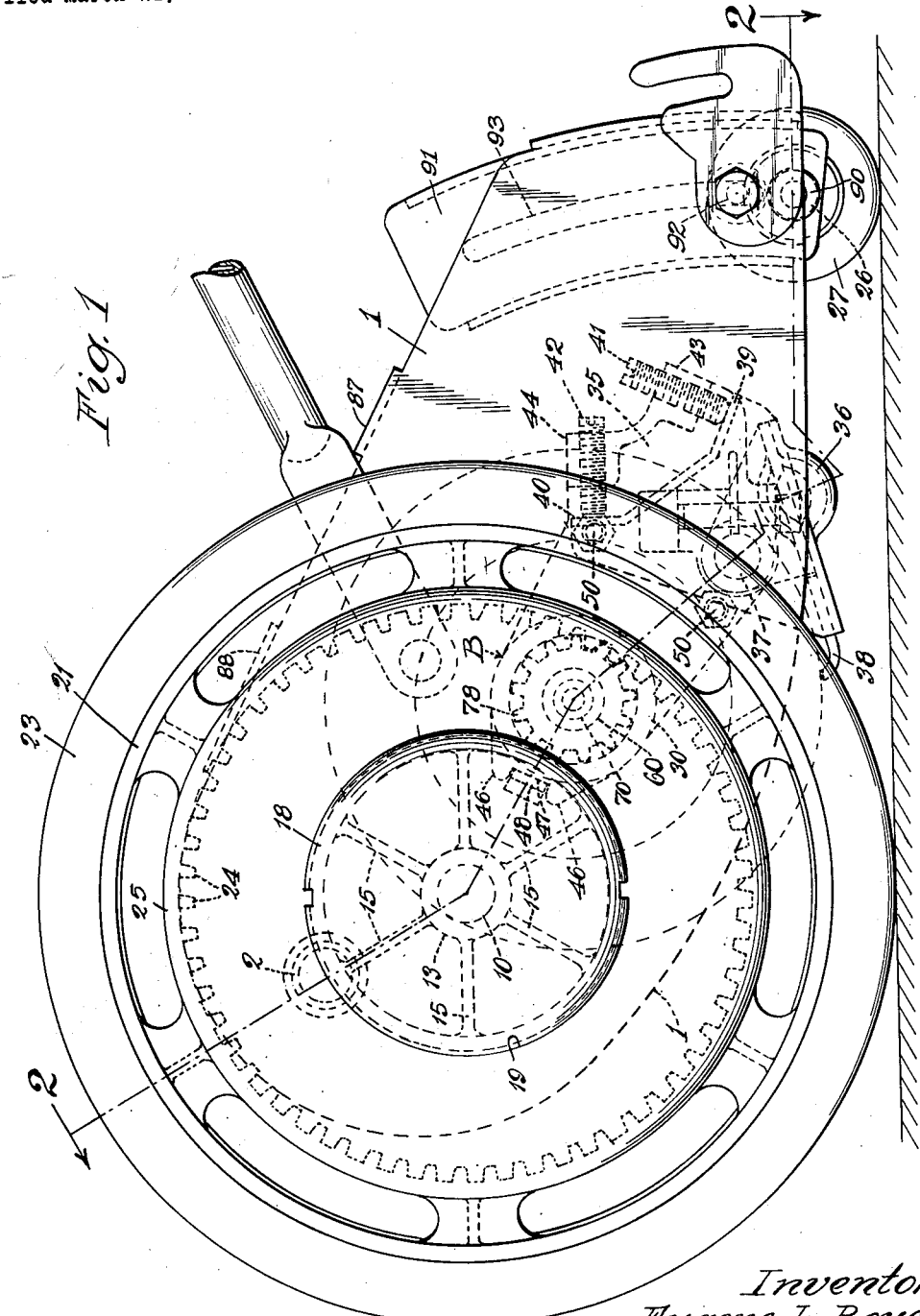
Inventors
Eugene L. Boyce
Peter L. Loewe
by Parker & Carter
Attorneys

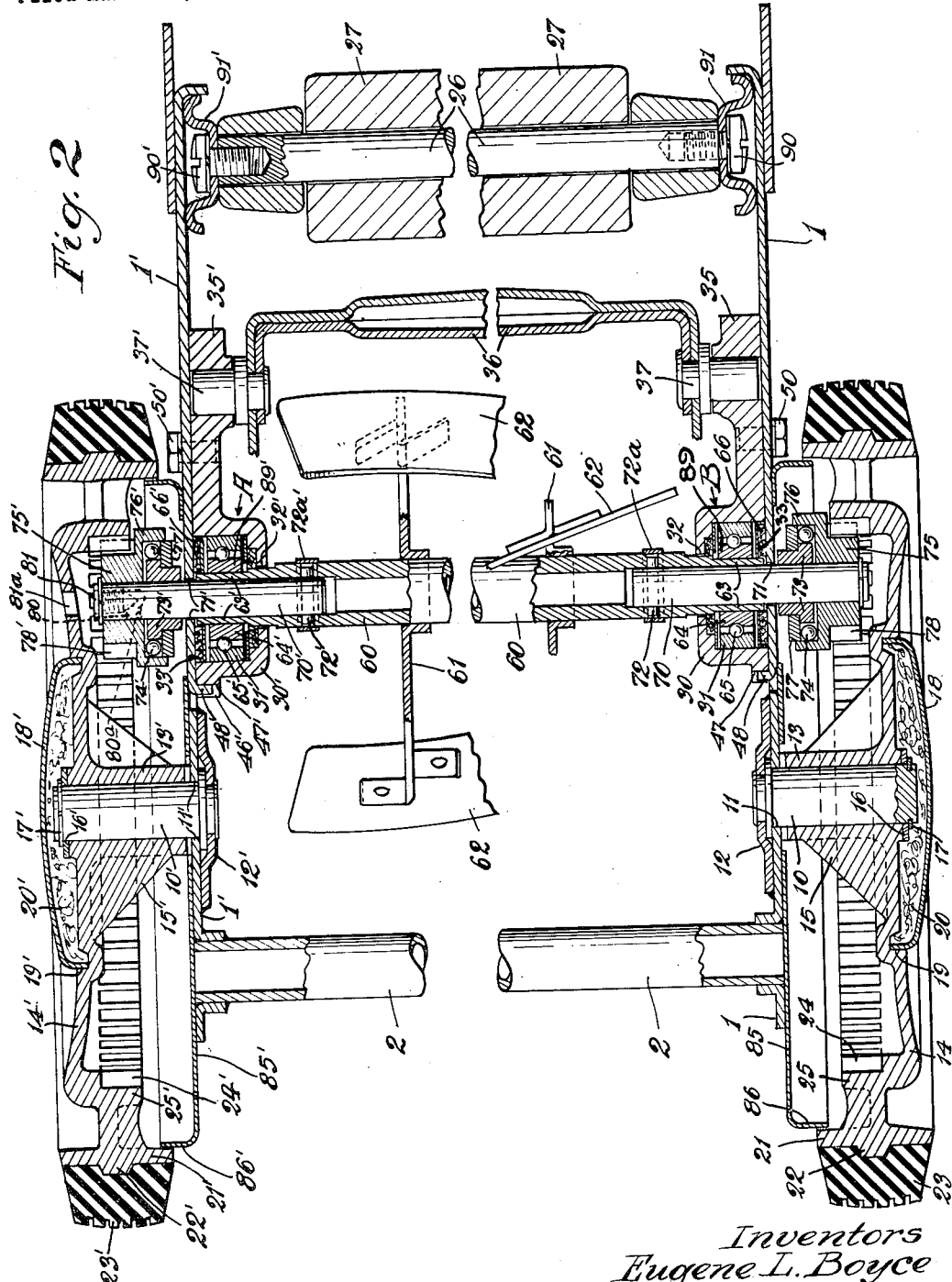

July 15, 1952   E. L. BOYCE ET AL   2,603,055
LAWN MOWER WITH REMOVABLE REEL ASSEMBLY
Filed March 21, 1946   3 Sheets-Sheet 3
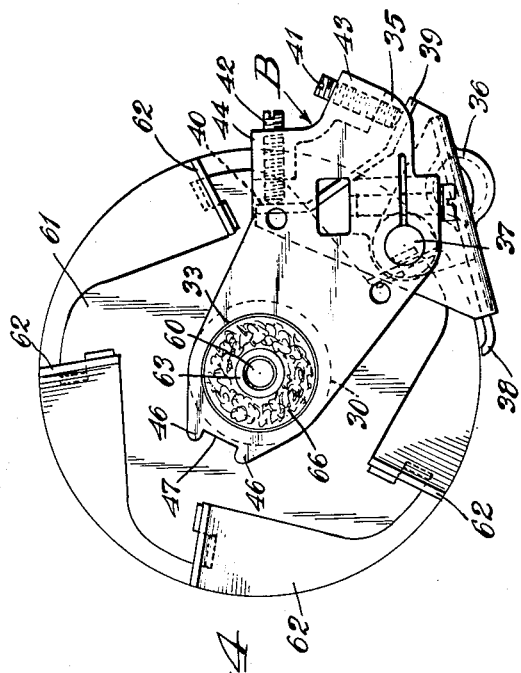
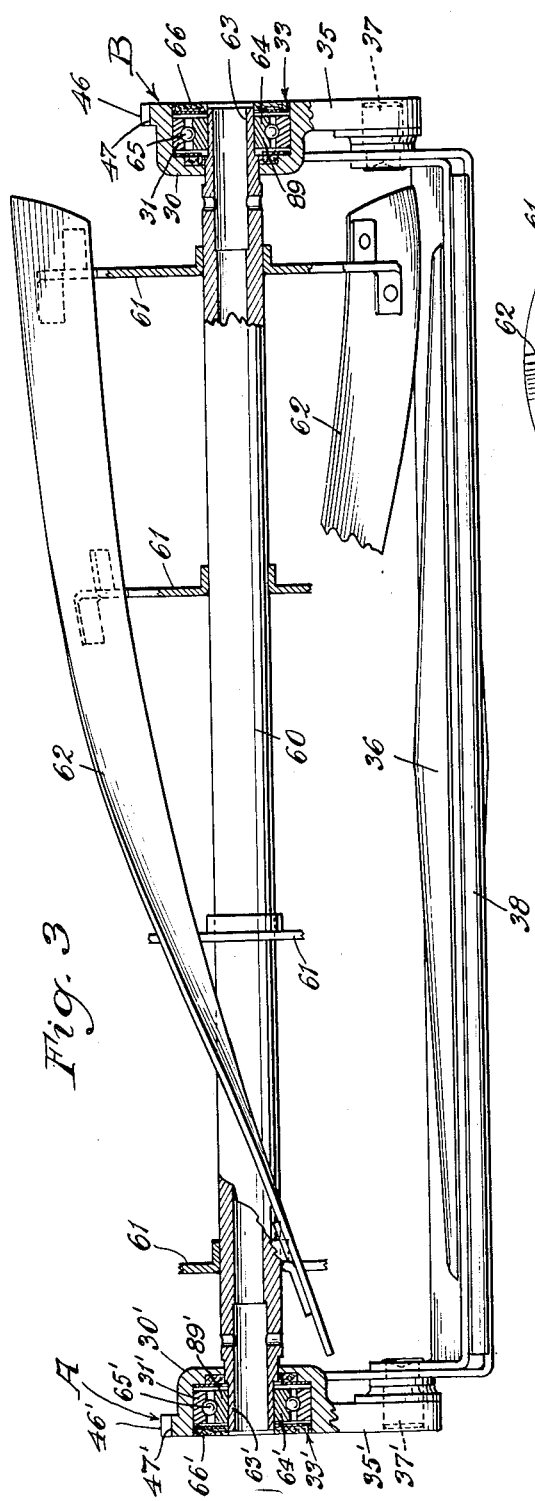
Inventors
Eugene L. Boyce
Peter L. Loewe
by Parker & Carter
Attorneys Patented July 15, 1952

2,603,055

UNITED STATES PATENT OFFICE 2,603,055

LAWN MOWER WITH REMOVABLE REEL ASSEMBLY

Eugene L. Boyce and Peter L. Loewe, Chicago, Ill., assignors, by mesne assignments, to Pioneer Gen-E-Motor Corporation, Chicago, Ill., a corporation of Delaware Application March 21, 1946, Serial No. 656,100

5 Claims. (Cl. 56—250)

This invention relates to an improvement in lawn-mowers.

One purpose is to provide an improved cutter reel and bar assembly which is bodily removable from the lawn-mower chassis.

Another purpose is to provide an improved lawn-mower wheel.

Another purpose is to provide improved means for removing the reel assembly from the lawn-mower.

Another purpose is to provide improved means for adjusting the cutter bar.

Another purpose is to provide improved supporting and lubricating means for the lawn-mower wheels.

Other purposes will appear from time to time in the course of the specification and claims.

The invention is illustrated more or less diagrammatically in the accompanying drawings, wherein;

Figure 1 is a side elevation;

Figure 2 is a section on the line 2—2 of Figure 1;

Figure 3 is a fragmentary elevation of the reel assembly, with parts in section; and Figure 4 is an end view of the structure of Figure 3.

Like parts are indicated by like symbols throughout the specification and drawings.

Referring to the drawings, 1, 1' indicate chassis side frame members, which are shown as connected by any suitable tubular strut 2, and may be further connected by top plates 87 and 88 not herein illustrated in detail.

Outwardly extending from each of the chassis or end plates 1—1' is a headed stub shaft 10—10'. Each said shaft extends inwardly through an aperture 11, 11' in the respective plates 1—1' and the head thereof is gripped by any suitable sheet metal retainer 12—12' which may be welded or otherwise secured to the respective shafts and to the inner face of the chassis plate 1—1'. The stub shafts 10—10' are surrounded by wheel hubs 13, 13' which in turn are connected to wheel discs 14, 14' and which are also provided with strengthening ribs 15, 15'. The wheels may be kept in position, for example by any suitable washers 16, 16' held by any suitable snap rings 17, 17'. The space about the outer ends of the stub shafts 10—10' may be protected by removable spring caps 18, 18'. The edges of the caps may be sprung into circumferential notches 19, 19' produced in the face of the respective wheel discs 14—14'. The spaces surrounded by the caps 18—18' may contain any suitable fibrous material 20, 20', adapted to hold a lubricant. Thus the wheel bearings are not only protected from dust but are also lubricated by a structure which is easily removed to permit removal of the wheel. 21, 21' indicates any suitable wheel rim which is mounted on or surrounds the wheel discs 14—14'. The wheel rims may be provided with a circumferential, outwardly extending ridge 22, 22' which assists in centering any suitable flexible and removable tire element 23, 23'. The respective wheels are each further provided with any suitable internal ring gear 24, 24', which may be internally formed in the cylindrical wheel portions 25, 25'.

The chassis or end plates 1 and 1' may be additionally connected and spaced by any suitable transverse shaft 26 upon which any suitable ground-engaging roller or rollers 27 are mounted. Said shaft 26 is adjustably secured to the chassis or end plates 1, 1' by means of a bolt 92 threaded through a slot 93 in the supporting plates 91 and 91', respectively. The indicated adjustment of the shaft 26, as illustrated in Figure 1, does not form part of the present invention.

A reel and cutter bar assembly is unitarily insertable in and removable from the space between the two chassis plates. The reel unit is illustrated as including two end members, generally indicated as A and B. Each of these end members includes a generally cylindrical bearing housing 30, 30', in which is positioned an outer ball bearing race 31, 31'. The housings are each apertured at their inner ends, as at 32, 32', respectively, to receive the ends of the reel shaft below described. The housings are outwardly open as at 33—33', the space being closed by the opposed chassis plates or end plates 1—1' respectively. The respective bearing housings are preferably formed integrally with rearward extensions 35, 35' to each of which is pivoted any suitable cutter bar assembly 36, shown as having outwardly extending studs or trunnions 37, 37'. The cutter bar assembly includes a blade portion 38 and adjusting abutments 39 and 40. To these adjusting abutments are opposed adjustable set screws 41, 42, which are screw threaded into any suitable lugs 43, 44, which form part of the rearward extensions 35—35'. The bearing housings are also provided with forwardly extending ears 46—46' which define between them a notch 47—47' adapted to be opposed respectively to abutment ears 48 which may be inwardly struck or upset from the chassis or end plates 1—1'.

When the end members are in the position in which they are shown in Figure 2, with the lugs 48, 48' received in the notches 47, 47' the end members A and B may be secured in position by suitable screws 50—50' which enter said members or extensions thereof and which also enter plates 1. These screws may be inwardly inserted through the plates 1—1' and may enter any suitable screw threaded receiving apertures in the rearward extensions 35—35'.

The reference character 60 indicates a hollow reel shaft, carrying a plurality of spiders 61, on which are mounted any suitable cutter blades 62. The shaft 60 is provided with end portions 63, 63' which receive end ball race members 89 and 89'. The reference character 65, 65' are any suitable balls or rollers positioned between the inner races 64' and the outer races 31—31' respectively. The reference character 66' indicates any suitable seals and lubricating means adapted to fill the otherwise empty area bounded by the outer walls of the bearing housings 30—30', the outer edges of race members 31, 31' and 64, 64', the inner wall of plates 1, 1', and the sides of end portions 63, 63'. The shaft 60 is shorter than the distance between the two plates 1—1'.

It will be understood that the structure so far described may be readily removed as a unit from between the chassis or end plates 1—1' by merely removing the screws 50, 50'. The entire structure may then be slid out. Assuming that the parts are in the position in which they are shown in Figure 2, with the screws 50, 50' in place, the drive connection between the hollow shaft 60 and the ground engaging wheels is provided as follows:

Two short shafts 70, 70' are illustrated, which may be inserted through apertures 71, 71' in the respective plates 1—1' and may penetrate into the hollow ends of the shaft 60 and may be locked against unintended endwise and rotary movement in relation to the hollow shaft 60 by the use of locking pins 72, 72', held against unintended release by any suitable spring ring 72a, 72a'. Secured to an outer portion of each of the shafts 70—70' is an inner clutch member 73, 73' adapted to receive a series of clutch balls 74, 74'. Normally free to rotate about the outer end of each of the shafts 70, 70' is an outer clutch member 75, 75' with its clutch ring 76, 76' surrounding the balls 74, 74'. The reference characters 77, 77' are any suitable ball retaining rings. The members 75—75' are provided with exterior teeth 78—78' adapted respectively to mesh with the internal ring gears 24—24'.

In response to the forward movement of the chassis, when pushed by the operator, the shafts 70, 70' are effective to rotate the hollow ended reel shaft 60 and to cause the blades 62 to move in the proper direction, in relation to the cutter bar 36, to cut grass. The inner clutch member 73 and outer clutch member 73, 73' and 75, 75', with the balls 74—74', are formed to act as an overrunning clutch, causing rotation of the shaft 60 when the mower is pushed forward, but causing no rotation when the direction of the mower is reversed. In order to lock the clutch out of action, a locking ball 80 is provided, received in any suitable socket in the shaft 70—70' (shown in Fig. 2 associated with shaft 70'), and positioned to be opposed by the conic ended screw 81. With the screw 81 locked against the ball 80, the member 75 acts as direct drive pinion connection between the shaft 60 and the ring gear 24'. Access to the screw 81 is afforded through an aperture 81a provided in wheel disc 14' as clearly shown in Fig. 2.

In order to shield and protect the ring gears, and the drive from the ring gears to the hollow shaft 60, there are provided outwardly concave guards 85, 85' having edges 86, 86' which extend within the hollow rims of the ground engaging wheels and overlap with the inner surfaces of the rim portions 21—21'.

It will be realized that whereas we have described and claimed a practical and operative device, nevertheless many changes may be made in size, shape, number and disposition of parts without departing from the spirit of our invention. We therefore wish our description and drawings to be taken as in a broad sense illustrative and diagrammatic, rather than as limiting us to the specific disclosure herein made.

The use and operation of our invention are as follows:

The mower herein described and shown provides a simple and rugged chassis structure, formed of two chassis or end plates 1 which are firmly secured together. Removably positioned in the chassis is a cutter reel assembly which includes the side or end members A and B, which carry the hollow ended reel shaft 60 and the adjustably mounted cutter bar 36. The unit is pre-assembled, and may be inserted as a unit in the space between the end members 1. It may then be anchored in place by engaging the notches 47, 47' with the lugs 48, 48'. The screws 50, 50' may then be inserted and the cutter reel assembly is firmly held in position. Thereafter, the shafts 70, 70' are inserted and locked into position by the pins 72, 72'. The next step is to apply the ground engaging wheels to the stub shafts 10, 10'. The final step is to apply the spring caps 18, 18', and the device is ready for use.

If the user wishes to sharpen the blades, for example by causing a reversed rotation of the cutter bar 36 to which an abrasive may be applied, the user may do so by locking the ball 80 by the screw 81. An aperture 81a in one of the wheels is alignable with the screw 81, so that the user can lock the ball 80 without demounting the wheel.

We claim:

1. In a lawn mower having a chassis including spaced, connected end plates, a pair of ground engaging wheels, one being rotatably mounted upon and exterior to each of the end plates, a cutter reel assembly mounted within and between the end plates and including a hollow ended reel shaft, a driving connection between an end of said reel shaft and a ground engaging wheel which includes an internal gear on the ground engaging wheel, a transmission shaft extending through an aperture in the side plate and having its inner end removably connected to the reel shaft, a pinion on the outer end of the transmission shaft, said pinion being in mesh with the internal gear of the ground engaging wheel, an overrunning clutch assembly between said pinion and the transmission shaft, and means for selectively securing the pinion to the transmission shaft or releasing it therefrom, whereby the cutter shaft is drivable by the rotation of the ground engaging wheel selectively in two different rotational directions.

2. The structure of claim 1 characterized in that the transmission shaft is normally masked by the ground engaging wheel, the ground engaging wheel having an aperture alignable with the outer end of the transmission shaft whereby the operator may have access to the end of the transmission shaft, the transmission shaft having at its end a locking member, externally accessible through the aperture in the ground engaging wheel, adapted to be moved selectively between operative and inoperative position by a tool inserted through the aperture in the ground engaging wheel, said locking member, when in operative position, being adapted to hold the pinion against rotation in relation to the transmission shaft.

3. The structure of claim 1 characterized in that the means for securing the pinion selectively to the transmission shaft includes a threaded member in the end of the transmission shaft, said threaded member having a tapered portion opposable to the locking ball whereby, in response to rotation of the threaded member from the release position to the locking position, the ball is locked between the transmission shaft and the pinion and thereby prevents their relative rotation.

4. In a lawn mower, a chassis, a cutter reel having a shaft rotatably mounted on said chassis, ground engaging wheels rotatably mounted on said chassis, at least one of said wheels having a circumferential gear, and a driving connection between said wheel and said real including a pinion in mesh with said gear and an over-running clutch connection between said pinion and said shaft, said pinion being normally rotatable in relation to said shaft, and means for locking said pinion against rotation in relation to said shaft, including a locking ball normally in inoperative position in a recess in said shaft, and means for thrusting said ball outwardly against said pinion, including an endwise movable plug generally axially positioned in said shaft, and having a tapered inner end portion adapted to engage said ball and to thrust it outwardly in response to predetermined endwise movement of said plug.

5. In a lawn mower, a chassis, a cutter reel having a shaft rotatably mounted on said chassis, ground engaging wheels rotatably mounted on said chassis, at least one of said wheels having a circumferential gear, and a driving connection between said wheel and said reel including a pinion in mesh with said gear and an over-running clutch connection between said pinion and said shaft, said pinion being normally rotatable in relation to said shaft, and means for locking said pinion against rotation in relation to said shaft, including a locking ball normally in inoperative position in a recess in said shaft, and means for thrusting said ball outwardly against said pinion, including an endwise movable plug generally axially positioned in said shaft, and having a tapered inner end portion adapted to engage said ball and to thrust it outwardly in response to predetermined endwise movement of said plug, said wheel including a housing portion apertured in axial alignment with said plug.

EUGENE L. BOYCE.
PETER L. LOEWE.

REFERENCES CITED

The following references are of record in the file of this patent:

UNITED STATES PATENTS

| Number | Name | Date |
| --- | --- | --- |
| 1,826,663 | Hessenbruch | Oct. 6, 1931 |
| 1,955,174 | Clapper | Apr. 17, 1934 |
| 2,071,162 | Davis et al. | Feb. 16, 1937 |
| 2,283,161 | Booton | May 19, 1942 |
| 2,372,300 | Speiser | Mar. 27, 1945 |
| 2,388,165 | Lowe et al. | Oct. 30, 1945 |